(12) United States Patent
Burkert et al.

(10) Patent No.: US 9,045,119 B2
(45) Date of Patent: Jun. 2, 2015

(54) METHOD FOR AUTOMATICALLY KEEPING A MOTOR VEHICLE AT A STANDSTILL

(75) Inventors: Jochen Burkert, Kornwestheim (DE); Raphael Oliveira, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/113,977

(22) PCT Filed: Mar. 22, 2012

(86) PCT No.: PCT/EP2012/055051
§ 371 (c)(1),
(2), (4) Date: Jan. 9, 2014

(87) PCT Pub. No.: WO2012/146443
PCT Pub. Date: Nov. 1, 2012

(65) Prior Publication Data
US 2014/0114544 A1 Apr. 24, 2014

(30) Foreign Application Priority Data
Apr. 26, 2011 (DE) .......... 10 2011 017 528

(51) Int. Cl.
*B60T 8/24* (2006.01)
*B60T 7/12* (2006.01)

(52) U.S. Cl.
CPC .............. *B60T 8/245* (2013.01); *B60T 7/122* (2013.01); *B60T 2201/06* (2013.01)

(58) Field of Classification Search
CPC ...... B60T 7/122; B60T 8/245; B60T 2201/06
USPC .......... 701/70, 78, 80, 48; 303/191, 192; 188/151 R, 152, 353
See application file for complete search history.

(56) References Cited

U.S. PATENT DOCUMENTS

| 5,129,496 A | * | 7/1992 | Sigl et al. ................. 192/49 |
| 6,428,120 B1 | * | 8/2002 | Holl .............................. 303/191 |
| 2003/0137192 A1 | * | 7/2003 | Hano et al. ................. 303/192 |
| 2005/0242665 A1 | * | 11/2005 | Goebels ....................... 303/191 |
| 2006/0284482 A1 | * | 12/2006 | Yang ............................ 303/191 |
| 2010/0181823 A1 | | 7/2010 | Eberling |
| 2011/0148186 A1 | * | 6/2011 | Reichert et al. ............ 303/191 |

FOREIGN PATENT DOCUMENTS

| DE | 102004056413 | | 5/2006 |
| DE | WO2009109254 A1 | * | 9/2009 |
| DE | 102009011802 | | 9/2010 |
| JP | 20100241271 A | * | 10/2010 |

OTHER PUBLICATIONS

International Search Report for PCT/EP2012/0555051, issued on Aug. 21, 2012.

* cited by examiner

*Primary Examiner* — Mary Cheung
*Assistant Examiner* — Rodney Butler
(74) *Attorney, Agent, or Firm* — Kenyon & Kenyon LLP

(57) ABSTRACT

A method is described for automatically keeping a motor vehicle at a standstill. The motor vehicle includes a braking system having a valve for limiting the brake pressure to a predefinable pressure threshold value. Gradient information and a pressure threshold value dependent on the gradient information are ascertained. The pressure threshold value is set at the valve as soon as the motor vehicle is at a standstill and the service brake is applied.

10 Claims, 2 Drawing Sheets

METHOD FOR AUTOMATICALLY KEEPING A MOTOR VEHICLE AT A STANDSTILL

FIELD OF THE INVENTION

The present invention relates to a method for automatically keeping a motor vehicle at a standstill as well as a corresponding device for carrying out the method according to the present invention.

BACKGROUND INFORMATION

Modern motor vehicles frequently include a hill hold control (HHC) which automatically keeps the vehicle on a gradient without the driver having to apply the brake for this purpose. Hill hold systems generally function as follows: During a braking operation in which the driver decelerates the vehicle to a stop, the brake pressure prevailing on the wheel brakes is blocked with the aid of shift valves—normally the so-called switching valves. For this purpose, the valves are activated by a control unit, in which the HHC function is stored, using an appropriate current. The valve current set at the valve determines the level of the brake pressure which the relevant valve is capable of maintaining. If the differential pressure dropping at the valve is greater than the pressure threshold value, medium flows into the valve. It is thus possible to maintain a predefined pressure in the wheel brakes, even if the driver's foot is removed from the brake pedal. To release the brakes, the driver must normally depress the accelerator pedal, or the HHC function is automatically deactivated when the brake pedal has no longer been depressed for, for example, approximately 2 seconds.

In the case of the hill hold systems known from the related art, the valves are normally not closed until the driver has already partially released the brake pedal and the brake pressure prevailing at the master brake cylinder has dropped to a predefined target pressure. To be able to close the valves at the above-named point in time, the brake pressure prevailing at the master brake cylinder is monitored with the aid of a pressure sensor, the so-called pre-pressure sensor. The target pressure is normally a pressure which is at least high enough to hold the vehicle securely at a standstill.

Known hill hold systems therefore require at least two sensors, namely, a sensor for determining the road gradient and a pressure sensor for monitoring the brake pressure in a brake circuit. Accordingly, common hill hold systems are relatively complex and are in particular too expensive as optional equipment in vehicles in the lower price category.

SUMMARY

An object of the present invention is therefore to provide a more cost-effective device for automatically holding a motor vehicle at a standstill, as well as a corresponding method.

According to the present invention, it is proposed to ascertain gradient information and a pressure threshold value which is dependent on it in a motor vehicle equipped with a hill hold control (HHC), and to set the pressure threshold value at a valve with the aid of which it is possible to maintain the brake pressure prevailing on one wheel brake, independently of the level of the brake pressure prevailing in the brake circuit. Since the pressure threshold value is set at the valve temporally independently of the brake pressure prevailing in the brake circuit, it is possible to dispense with the pre-pressure sensor required in the related art, making the hill hold system significantly more cost-effective.

The valve according to the present invention is preferably a control valve, at which a certain pressure threshold value may be set by specifying a valve current. The pressure threshold value determines the pressure which the valve is capable of maintaining. As long as the differential pressure dropping at the valve is greater than the set pressure threshold value, medium flows into the valve.

According to a preferred specific embodiment of the present invention, the pressure threshold value is set at the valve before the driver has begun to release the brake. Preferably, the pressure threshold value is set as soon as the service brake is applied and the vehicle has come to a stop. It is possible to detect that the service brake is applied via, for example, the stop light switch (SLS). SLS closed denotes "brake applied" and SLS open denotes "brake not applied." It is possible to detect the standstill of the vehicle in a known manner with the aid of the wheel speed sensors.

For smaller gradients, less brake pressure is required in principle than for larger gradients to keep the vehicle at a standstill. The pressure threshold value set at the valve is therefore preferably lower for smaller gradients than for larger gradients. On the level, it may amount to, for example, 15 bar, and at a gradient of 20%, it may amount to, for example, 50 bar.

According to one specific embodiment of the present invention, as a function of the gradient, a minimum brake pressure is ascertained which is required to keep the vehicle at a standstill, and the pressure threshold value is then set at least as high as the minimum brake pressure. In this way it is ensured that the vehicle will not be unintentionally set in motion. The minimum brake pressure may be read out from, for example, a characteristic curve.

For safety reasons, a higher value than the minimum brake pressure may be set at the valve. According to one specific embodiment of the present invention, a pressure increase dependent on the gradient may, for example, be ascertained, and the pressure threshold value may be set higher than the minimum brake pressure by the amount of the pressure increase.

The gradient may be estimated, for example, with the aid of an acceleration sensor or measured directly using a gradient sensor.

The pressure threshold value preferably remains set at the valve until a startup intent of the driver has been detected. The valve may be opened, for example, when a startup intent has been detected and the engine torque is greater than the torque required for starting on the gradient.

In a vehicle having multiple brake circuits and/or multiple valves, identical or different pressure threshold values may be set in principle.

For carrying out the method described above, a control device having a corresponding algorithm is preferably provided.

DETAILED DESCRIPTION

Figure 1A:
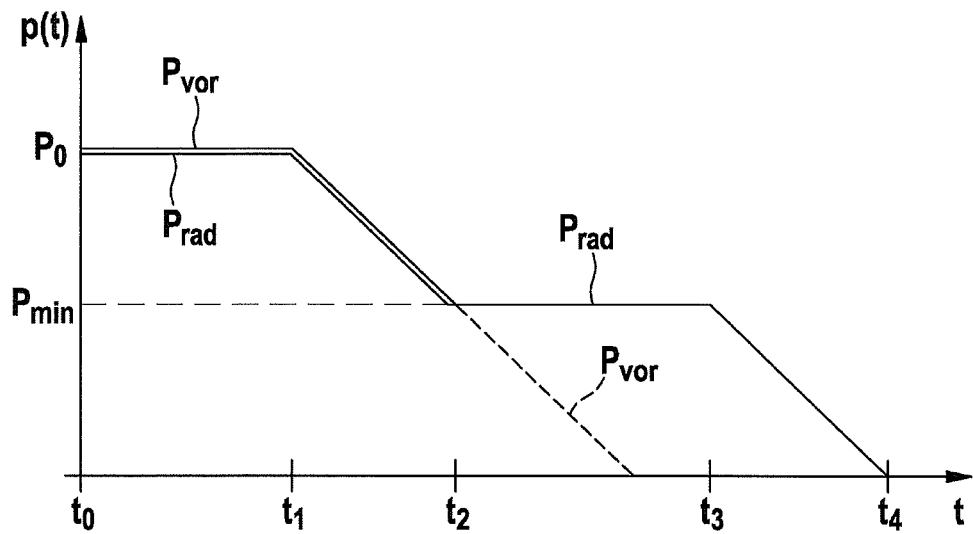
FIG. 1a shows the time curve of the brake pressure at one wheel and at the master brake cylinder in a brake circuit of a vehicle which is equipped with a known hill hold system.

FIG. 1 shows an exemplary curve of brake pressure p at a wheel ($p_{wheel}$) and at the master brake cylinder ($p_{vor}$) in a brake circuit of a vehicle, which is equipped with a hill hold control known from the related art (hill hold system). It is assumed that the vehicle is on a gradient at a standstill at point in time $t_0$. The driver keeps the brake pedal depressed. A brake pressure $p_0$ prevails in the vehicle's brake circuit.

Starting at point in time $t_1$, the driver takes his foot off the brake pedal, and brake pressure $p_{vor}$ begins to fall. The lowering of brake pressure $p_{vor}$ is monitored with the aid of a pressure sensor (pre-pressure sensor). At point in time $t_2$, brake pressure $p_{vor}$ reaches a minimum brake pressure $p_{min}$, which is the minimum required for keeping the vehicle at a standstill. This minimum brake pressure $p_{min}$ is dependent on the gradient and other influencing factors, such as the weight of the vehicle, and is calculated in a control unit of the hill hold system.

Figure 1B:
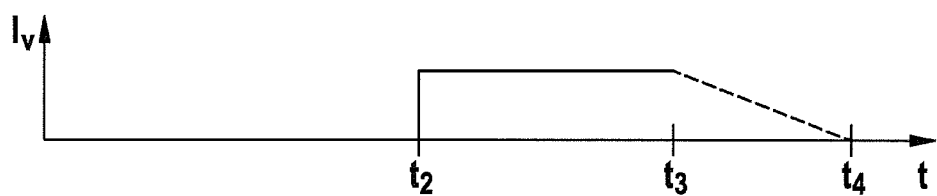
FIG. 1b shows the time curve of a valve current of a valve for automatically maintaining a brake pressure at a wheel brake.

When pressure $p_{vor}$ prevailing in the brake circuit at point in time $t_2$ reaches minimum braking pressure $p_{min}$, a value—normally a so-called switching valve—is closed in the brake circuit, which locks instantaneous brake pressure $p_{vor}$ in the wheel brake. For this purpose, the valve is activated using a certain current, which determines the level of the brake pressure, which the valve is capable of maintaining without medium flowing into it. FIG. 1b shows the corresponding curve of valve current $l_v$. In the present case, a pressure threshold value $p_s$ is set at the valve at a level equal to minimum brake pressure $p_{min}$; $p_s = p_{min}$ applies. Thereafter, wheel brake pressure $p_{wheel}$ remains at the level of minimum brake pressure $p_{min}$ while master brake cylinder pressure $p_{vor}$ continues to fall. Due to the pressure locked in the wheel brakes, the vehicle is automatically kept at a standstill.

Subsequently, the driver begins to depress the accelerator pedal in order to start driving. As soon as the engine torque has reached a predefined threshold value at point in time $t_3$ the switching valve is opened. For this purpose, valve current lv is slowly lowered (ramp-shaped) to a value of zero. At point in time $t_4$, the valve current is equal to zero. The wheel brakes are then completely free of pressure, and the vehicle is able to start driving.

Figure 2A:
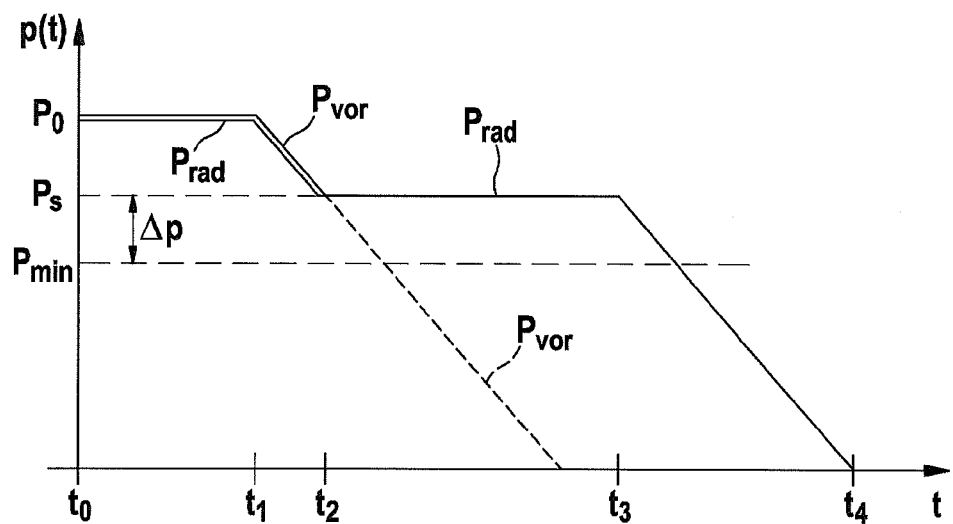
FIG. 2a shows the time curve of the brake pressure in a brake circuit of a vehicle which is equipped with a hill hold system according to the present invention.

FIG. 2a shows the curve of the brake pressure in the same braking situation, but in a vehicle that is equipped with a hill hold control (hill hold system) according to the present invention. In contrast to the system described above, this hill hold control requires no pre-pressure sensor. It is thus unnecessary to install a pre-pressure sensor in the vehicle.

At point in time $t_0$, the vehicle is again on a gradient and the driver activates the brake pedal. The state "vehicle standstill" is detected, for example, with the aid of the wheel speed sensors. The absence of a pre-pressure sensor makes it impossible to measure the brake pressure prevailing in the braking system. An activation of the service brake is only ascertained qualitatively from the switching state of the stop light switch (SLS). SLS closed denotes "brake applied" and SLS open denotes "brake not applied."

Figure 2B:
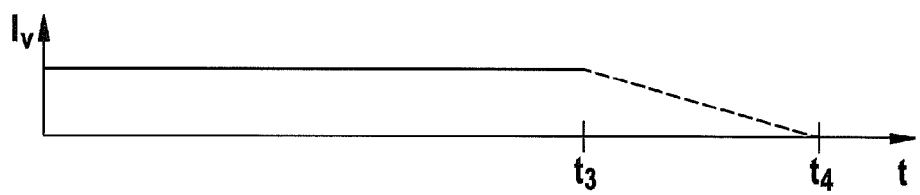
FIG. 2b shows the associated time curve of a valve current of a valve for automatically maintaining a brake pressure at a wheel brake.

In the example shown, the valve is immediately closed at point in time $t_0$ after it has been detected that the vehicle is at a standstill and the brake is applied simultaneously. A pressure threshold value is set at the valve which is sufficiently high to keep the vehicle at a standstill. FIG. 2b shows in turn the corresponding curve of valve current $l_v$.

Pressure threshold value $p_s$ is for reasons of safety preferably set to a value that is larger by one pressure increase $\Delta p$ than a minimum brake pressure $p_{min}$, which is the minimum required to keep the vehicle at a standstill. Pressure threshold value $p_s$ is calculated from an algorithm while taking into consideration the gradient, or it is read out from a characteristic curve. Depending on the gradient, pressure threshold value $p_s$ may amount to, for example, between 10 bar (on the level) and 50 bar (at, for example, a 20% gradient).

Starting at point in time $t_1$, the driver begins to release the brake, and brake pressure $p_{vor}$ begins to fall. As long as the differential pressure prevailing at the valve is greater than pressure threshold value $p_s$, medium flows through the switching valve in the direction of the master brake cylinder. At point in time $t_2$, brake pressure $p_{vor}$ reaches pressure threshold value $p_s$. While brake pressure $p_{vor}$ subsequently continues to fall, wheel brake pressure $p_{wheel}$ remains at the level of pressure threshold value p. The vehicle is thus automatically kept at a standstill.

Starting at point in time $t_3$, a startup intent of the driver is again detected; the switching valve is opened slowly and brake pressure $p_{wheel}$ begins to fall. This causes the wheel brakes to release and the vehicle is able to start.

What is claimed is:

1. A control device for automatically keeping a motor vehicle at a standstill with an aid of a valve which may be used for holding a brake pressure prevailing at a brake at a predefinable value, comprising: an arrangement for ascertaining a gradient; an arrangement for ascertaining a pressure threshold value dependent on the gradient; and an arrangement for setting the pressure threshold value at the valve independently of the brake pressure prevailing in a brake circuit when the motor vehicle is at the standstill.

2. A method for automatically keeping a motor vehicle at a standstill with an aid of a valve which may be used for holding a brake pressure prevailing at a brake at a predefinable value, comprising:
   ascertaining a gradient;
   ascertaining a pressure threshold value dependent on the gradient;
   setting the pressure threshold value at the valve independently of the brake pressure prevailing in a brake circuit when the motor vehicle is at the standstill;
   generating a current on the basis of the pressure threshold value; and
   actuating the valve in accordance with the generated current in order to keep the motor vehicle at a standstill.

3. The method as recited in claim 2, further comprising: ascertaining a minimum brake pressure needed for keeping the vehicle at the standstill as a function of the gradient, wherein the valve is a pressure limiting valve; and setting the pressure threshold value in the pressure limiting valve at at least the same level as the minimum brake pressure.

4. The method as recited in claim 2, wherein the gradient is ascertained by at least one of an acceleration sensor and a gradient sensor.

5. The method as recited in claim 2, wherein the pressure threshold value is set at the valve before a driver begins to release the brake.

6. The method as recited in claim 2, wherein the pressure threshold value is set at the valve as soon as a brake application is detected and the vehicle has come to a stop.

7. The method as recited in claim 2, further comprising:
   ascertaining an activation of the brake from a state of a stop light switch.

8. The method as recited in claim 2, wherein the pressure threshold value is set at the valve until a startup intent of a driver is detected.

9. The method as recited in claim 2, wherein in the case of the vehicle having at least one of multiple brake circuits and multiple valves, one of identical and different pressure threshold values are set.

10. The method as recited in claim 3, further comprising: ascertaining a pressure increase dependent on the gradient; and setting the pressure threshold value higher than the minimum brake pressure by an amount of the ascertained pressure increase.

\* \* \* \* \*